United States Patent [19]

Green et al.

[11] Patent Number: 5,134,169

[45] Date of Patent: Jul. 28, 1992

[54] GOLD SELECTIVE ION EXCHANGE RESINS

[75] Inventors: Brian R. Green, Roodepoort; Irene Tyc, Johannesburg; Adriana H. Schwellnus, Pinelands, all of South Africa

[73] Assignee: Mintek, South Africa

[21] Appl. No.: 449,815

[22] Filed: Dec. 13, 1989

[30] Foreign Application Priority Data

Dec. 19, 1988 [ZA] South Africa .................. 88/9433

[51] Int. Cl.$^5$ .................. C08J 5/20; C02F 1/42
[52] U.S. Cl. .................. 521/25; 521/32; 521/38; 210/684; 210/688
[58] Field of Search .................. 521/25, 27, 32

[56] References Cited

U.S. PATENT DOCUMENTS 4,093,567  6/1978  Huawetz et al. .................. 521/32
4,321,331  3/1982  Widiger, Jr. et al. .................. 521/32
4,785,020 11/1988  Boom .................. 521/32

FOREIGN PATENT DOCUMENTS 901573 10/1960  United Kingdom .................. 521/32

Primary Examiner—Thurman K. Page
Assistant Examiner—Peter F. Kulkosky
Attorney, Agent, or Firm—Mason, Fenwick & Lawrence

[57] ABSTRACT

A gold selective ion exchange resin and process for the recovery of gold from solutions thereof is described. The resin has a macroporous structure and functional groups selected from alkylamine groups wherein the alkyl chain has between 3 and 6 carbon atoms, preferably tributylamine groups. The functional group content of the resin is from 0,4 mmol/g to 1,8 mmol/g and the water retention capacity is at least 30%. The process for recovering gold involves adsorption thereof onto such resin, optionally directly from a slurry, and elution preferably using a thiourea solution.

6 Claims, 3 Drawing Sheets

LOADING OF METAL-CYANIDES FROM SYNTHETIC PREGNANT LIQUOR (IRA-400)

LOADING OF METAL-CYANIDE FROM SYNTHETIC PREGNANT LIQUOR (RESIN 1)

ELUTION OF Au FROM RESIN 1 (Au ON RESIN ~50 000 mg/kg; ELUTION RATE 1 TO 2 BED VOLUMES/h)

GOLD SELECTIVE ION EXCHANGE RESINS

FIELD OF THE INVENTION

THIS INVENTION relates to gold selective ion exchange resins and, more particularly, but not exclusively, to ion exchange resins which are suitable for use in a resin-in-pulp type of extraction process.

BACKGROUND TO THE INVENTION

Numerous different ion exchange resins have been proposed for the selective extraction of gold from leach solutions. Weak-base resins were generally considered to be the most advantageous in view of the anticipated ease of elution with aqueous sodium hydroxide. However, such weak-base resins were accompanied by various disadvantages.

Work has been conducted in addition on commercially available strong-base resins, such resins having a higher capacity than do weak-base resins in the typical gold-cyanide liquor. Also, the chemistry involved in adsorption of ions onto strong-base resins is less complex than in the case of weak-base resins. This is because the charge on the resin is fixed and the effect of pH can generally be disregarded.

In spite of these advantages, the selectivity of such commercially available strong-base resin towards gold has as far as applicant is aware, been inadequate.

Test work has been carried out on certain experimental strong base resins having various different functional amine groups. (See article entitled "The Extraction of Metals from alkaline cyanide solutions by basic ion exchange materials" by A. A. Büggs et al - Published by Department of Scientific and Industrial Research, National Chemical Laboratory, Teddington, Middlesex 1963). These resins, however, whilst having a satisfactory loading and selectivity towards gold, exhibited poor elution characteristics and were accordingly unsuitable for commercial exploitation. Effective elution could only be achieved when the resin was further modified by the inclusion of weak-base groups and furthermore a methanolic solution of thiourea or thiocyanate had to be used as eluant. Aqueous solutions of thiourea, which are better suited to commercial application required about 40 bed volumes of eluant to effectively remove adsorbed gold from a structure modified with weak-base groups. This volume of eluant is undesirable in a commercial operation.

It has now surprisingly been found that such drawbacks are satisfactorily alleviated by properly selecting the resin matrix.

It is, accordingly, the object of this invention to provide a strong-base ion exchange resin which exhibits good selectivity towards gold and, generally speaking, advantageous properties for the extraction and elution of gold.

SUMMARY OF THE INVENTION

In accordance with this invention there is provided a gold selective ion exchange resin of a type in which the resin matrix carries selective functional groups thereon, said resin having a macro-porous structure and said functional groups being selected from alkylamine groups wherein the alkyl chain is between three and six carbon atoms in length, the ion exchange resin having a di-vinyl benzene content of between 3% and 12% or an equivalent quantity of another cross-linking agent, a functional group content of from 0,4 mmol/g to 1,8 mmol/g, and a water retention capacity of at least 30%.

Further features of the invention provide for the resin matrix to be that of polyacrylics, polyamines, phenol/-formaldehyde copolymer or, in particular, polystyrene cross-linked using divinylbenzene; for the divinylbenzene in a polystyrene-divinylbenzene matrix to be present in an amount of from about 4% to 12%; for the functional groups to be tributylamine groups; and for the functional group content to be between 0,8 to 1,2 mmol/g, preferably about 0,9 mmol/g.

The invention also provides a process for the extraction of gold from solutions thereof, in particular cyanide solutions thereof, which comprises contacting a solution containing said gold in solution with a resin as above defined, separating the resin and barren solution, and recovering adsorbed gold by elution.

Further features of this aspect of the invention provide for the solution to be part of a slurry in which case the process is carried out as a resin-in-pulp process; for elution to be carried out using a solution of at least one of thiourea, ammonium thiocyanate, and zinc cyanide; for gold to be recovered from the eluate by cementing it out onto a suitable metal such as steel wool, powdered aluminium or other suitable metal or, alternatively, by electro-winning; and for the loaded resin to be washed with mineral acid, conveniently $1M H_2SO_4$ prior to elution thereof.

It will be clear that, in order to produce resins as above defined, a porogen must be included in the resin reaction mixture and the porogen is included to an extent (generally between 10% and 150% of the monomer mass for a styrene-divinylbenzene resin) in order to achieve the active group content and water retention capacities defined above.

In order that the invention may be more fully understood, one example thereof will now be described with reference to the accompanying drawings.

DETAILED DESCRIPTION WITH REFERENCE TO THE DRAWINGS

Figure 1:
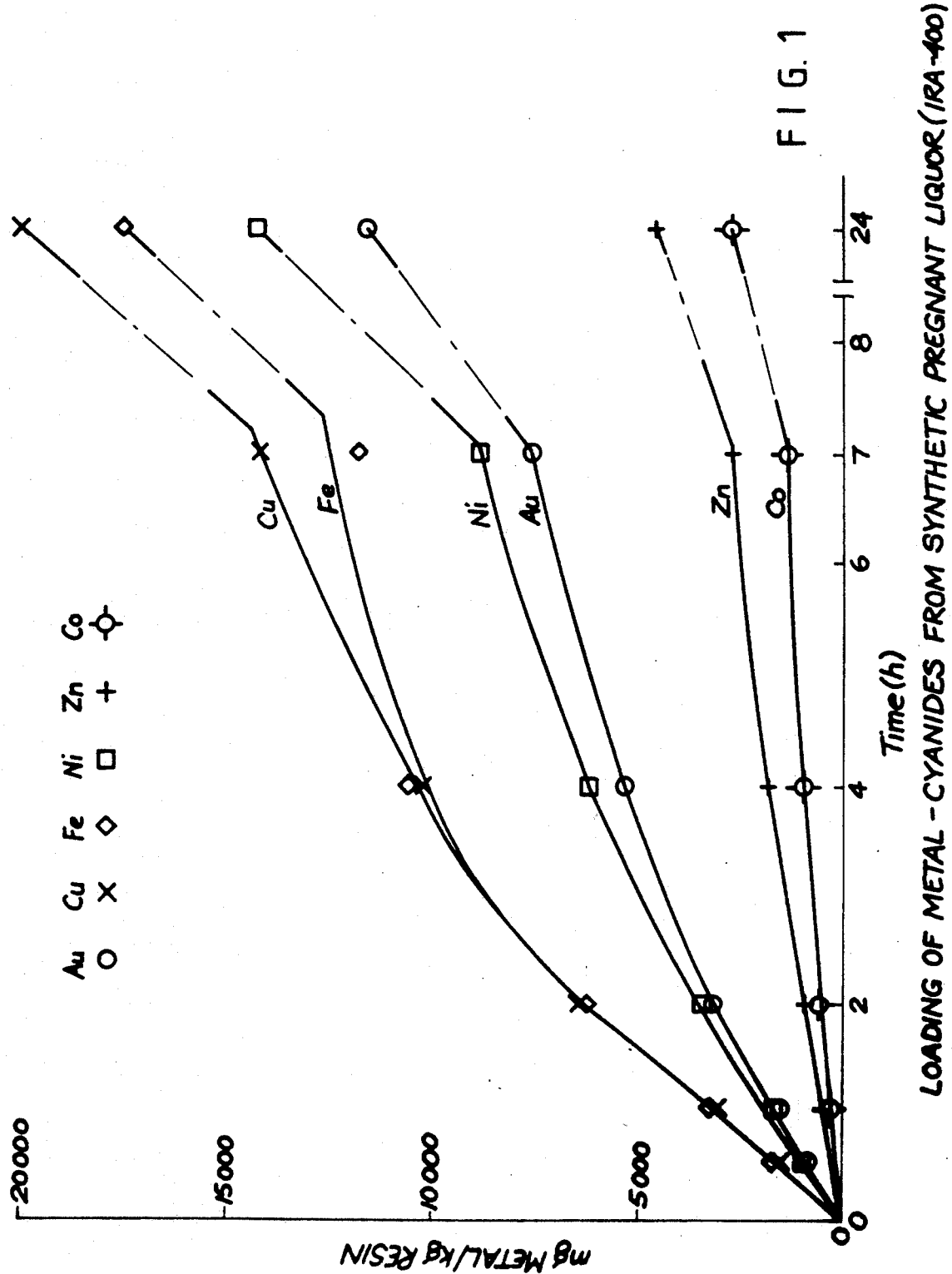
FIG. 1 is a graph of the loading of metal cyanides from a synthetic pregnant liquor onto an existing resin namely that sold by Rohm & Haas under the trade name Amberlite IRA400.

By way of comparison there is shown in FIG. 1 graphs of the loading of various metal cyanides from synthetic pregnant liquor solution containing 5,0 mg/l gold (Au), 0,5 mg/l silver (Ag), 10 mg/l copper (Cu), 2 mg/l zinc (Zn), 1 mg/l cobalt (Co), 5 mg/l nickel (Ni), 10 mg/l iron (Fe) in the form of cyanide complexes onto a commercially available strong-base resin sold by Rohm & Haas under the trade name Amberlite IRA400. 0,3 g sample of resin was contacted with solution by pumping the synthetic solution through the resin bed for diferent periods of time at a flow rate of 2,5 ml/min. The resins were analysed for their metal content. It will be noticed from the graphs of FIG. 1 that the loading of gold is not nearly as effective as that of copper, iron and nickel and, accordingly, this resin was not considered to be suitably selective for a gold extraction process.

Turning now to the present invention, a resin (designated "resin 1") was prepared by stirring 10 g of chloromethylated macroporous matrix (polystyrene with 6,6% divinylbenzene) in a solution of 3,9 ml of tri-n-butylamine in 20ml ethanol. The mixture was kept at 25° C. for 15 mins. heated from 25° C. to 75° C. for 20 mins and maintained at 75° C. for 7 hours. The resultant resin was washed with ethanol and water and taken through two acid/base cycles before being tested. The water retention capacity was 52% and the functional group content, based on the chloride capacity, was 0,91 mmol/g.

Figure 2:
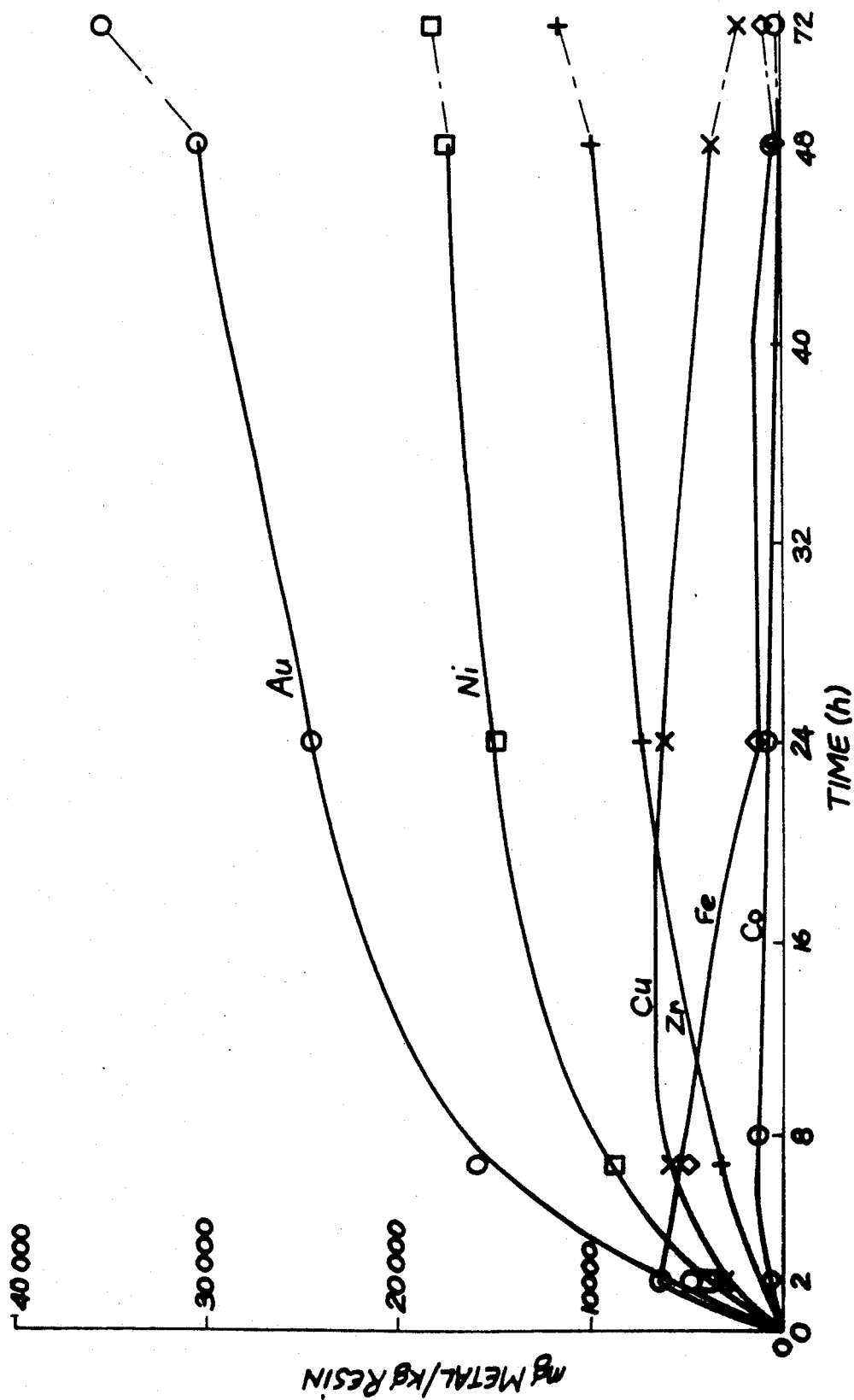
FIG. 2 is a similar set of graphs but showing the loading using a resin of the present invention; and, FIG. 3 is a graphical representation illustrating the elution of gold from the resin used in respect of the results illustrated in FIG. 2 for three different elution agents.

Resin 1 prepared as described above was contacted with a synthetic pregnant solution having the composition described above. The results are shown in FIG. 2 where the milligrams of metal adsorbed per kilogram of resin are plotted against time of contact. It will be noticed that the adsorption of gold was superior to the adsorption of any other of the metal complex ions thus showing a substantial improvement over the results illustrated in FIG. 1.

Figure 3:
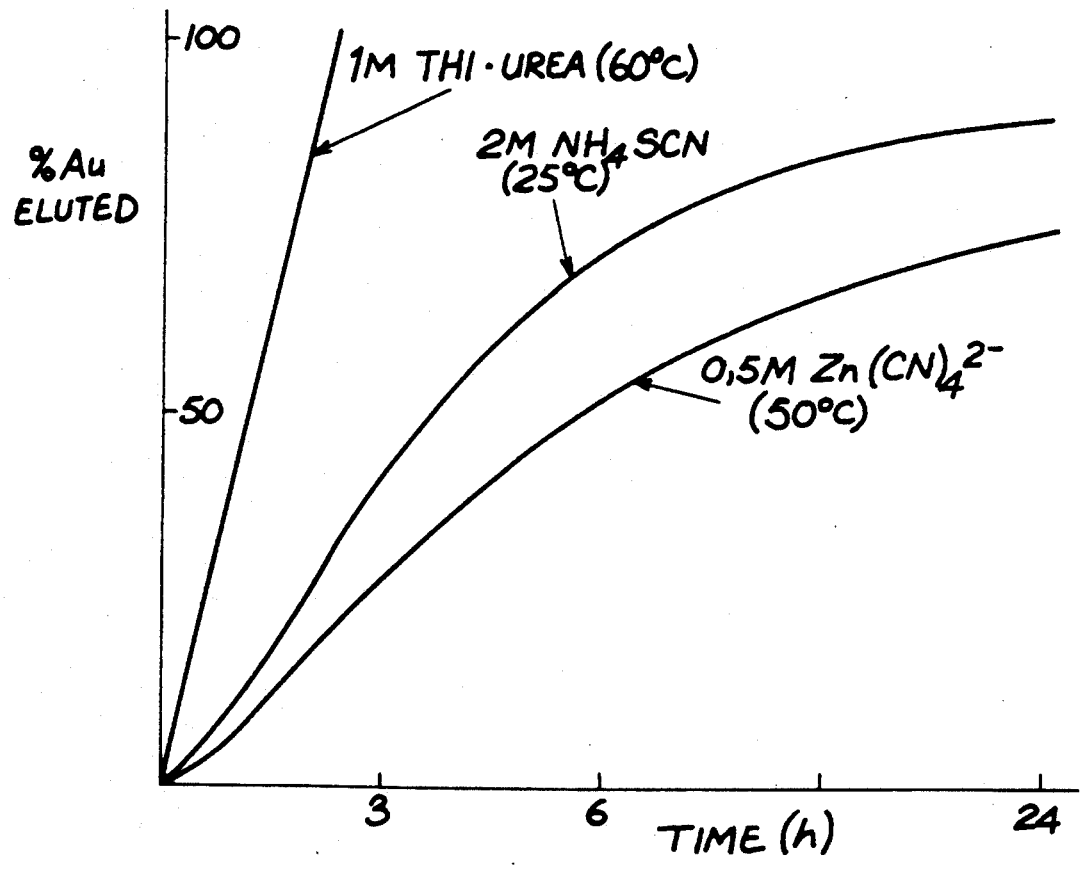

It was found that resins loaded as above described to a level of about 50 000 mg/kg with gold, and to different extents with base metal cyanides, could be eluted in a column by pumping the eluant through the resin bed at a flow rate of 1 to 2 bed vols. per hour. Three eluants, namely 1M-thiourea in 0,1M $H_2SO_4$ at 60° C., 2M ammonium thiocyanate at 25° C.; and 0,5M in a $Na_2Zn(CN)_4$ at 50° C. were found to be effective. The results are illustrated in FIG. 3 where it will be seen that the aqueous thiourea solution at 60° C. was the most effective and less than 10 bed volumes of this eluant were required.

Prior to elution the loaded resin was washed with 1M $H_2SO_4$ solution to remove base metals and the eluted gold was recovered from the eluate by cementing it out onto steel wool.

The superiority of resin having alkylamine active groups with alkyl chains of 3 or more carbon atoms was demonstrated by a series of tests in which resins were provided with different active groups. The active groups tested were trimethylamine (TMA), triethylamine (TEA) tributylamine (TBA), dimethylethanolamine (DMEOA) and pyridine (PYR). The results are shown in Table I below.

and the active groups were attached thereto by the same method.

The invention therefore provides advantageous gold selective ion exchange resins of a strong-base type which can be eluted effectively without the resin becoming poisoned to any appreciable extent.

What we claim as new and desire to secure by Letters Patent is:

1. A strong-base ion exchange resin which preferentially absorbs gold cyanide complexes with respect to nickel cyanide complexes in a solution containing metal cyanides of gold and nickel comprising:
   a resin matrix; and
   strong base functional groups attached to said resin matrix, said resin matrix having a macro-porous structure, and said strong base functional groups comprise a majority alkylamine groups having alkyl chains between four and six carbon atoms in length, wherein said resin has a water retention capacity of at least 30% and a functional group content of from about 0.4 mmol/g to 1.2 mmol/g.

2. A strong-base ion exchange resin which preferentially absorbs gold cyanide complexes with respect to nickel cyanide complexes in a solution containing metal cyanides of gold and nickel comprising:
   a resin matrix; and
   strong base functional groups attached to said resin matrix, said resin matrix having a macro-porous structure, wherein said functional groups comprise a majority of tributylamine groups, and said resin has a water retention capacity of at least 30% and a functional group content of from about 0.4 mmol/g to 1.2 mmol/g.

3. An ion exchange resin as claimed in claim 1, wherein said resin matrix is selected from the group consisting of polystyrenes, polyacrylics, polyamines and phenol/formaldehyde copolymer.

4. An ion exchange resin as claimed in claim 1, wherein said resin matrix comprises polystyrene crosslinked with divinylbenzene, said resin containing between 3 and 12% of said divinylbenzene, wherein said functional groups comprise a majority of alkylamine groups having alkyl chains between three and six carbon atoms in length.

5. An ion exchange resin as claimed in claim 1, wherein said functional group content is from 0.8 mmol/g to 1.2 mmol/g.

TABLE I

THE EFFECT OF ACTIVE GROUP TYPE ON GOLD LOADING FROM A SYNTHETIC PREGNANT SOLUTION

| Matrix | Amine | Capacity, mmol/g | Au on resin $[(Au)_R]$ mg/kg | $[Au]_R/[M]_R$ | | | | |
|---|---|---|---|---|---|---|---|---|
| | | | | Cu | Zn | Co | Ni | Ag |
| 9% DVB macroporous | TMA | 0,40 | 13300 | 3,2 | 1,8 | 2,8 | 1,3 | 51 |
| | TEA | 0,66 | 23500 | 5,2 | 0,8 | 3,6 | 0,7 | 149 |
| | TBA | 0,60 | 44300 | 13,7 | 1,4 | 32,3 | 1,3 | 47 |
| | TEOA | 0,44 | 11200 | 2,5 | 2,2 | 4,3 | 1,2 | 61 |
| | TMA | 2,34 | 10600 | 3,2 | 0,7 | 0,5 | 0,5 | — |
| | TEA | 1,58 | 24000 | 2,7 | 0,3 | 2,1 | 0,4 | 132 |
| | TBA | 0,45 | 60800 | 25,7 | 1,7 | 41,7 | 3,0 | 165 |
| | DMEOA | 2,81 | 12600 | 0,4 | 0,3 | 0,2 | 0,2 | 70 |
| | PYR | 0,80 | 23400 | 3,7 | 1,1 | 2,5 | 0,7 | 82 |
| 4,2% DVB macroporous | TBA | 1,11 | 59600 | 8,6 | 1,0 | 71,3 | 1,2 | 97 |

It will be seen that the ratios of gold adsorbed in relation to the various other metals present in solution are substantially superior in respect of TBA as active groups. In all cases the same resin matrix was employed 6. An ion exchange resin as claimed in claim 1, wherein said functional group content is about 0.9 mmol/g.

* * * * *